May 4, 1926.

J. S. WALLER

SNAP HOOK

Filed July 18, 1925

1,583,326

Inventor
J. S. Waller,
By Clarence A. O'Brien
Attorney

Patented May 4, 1926.

1,583,326

UNITED STATES PATENT OFFICE.

JESSE S. WALLER, OF TERRE HAUTE, INDIANA.

SNAP HOOK.

Application filed July 18, 1925. Serial No. 44,473.

*To all whom it may concern:*

Be it known that I, JESSE S. WALLER, a citizen of the United States, residing at Terre Haute, in the county of Vigo and State of Indiana, have invented certain new and useful Improvements in a Snap Hook, of which the following is a specification.

This invention relates to improvements in snap hooks and has for its principal object to provide a hook which cannot become accidentally opened or unsnapped when a strain is placed on the movable sleeve which is arranged on the shank portion of the snap hook.

Another important object of the invention is to provide a snap hook of the above mentioned character wherein the sleeve must be given a slight turn in order to move the same out of engagement with the free end of the hook whenever it is desired to unsnap the hooks.

A further object is to provide a snap hook of the above mentioned character wherein means is provided for automatically returning the sleeve to its normal position when the pressure on the sleeve is released.

A still further object is to provide a snap hook of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the same:

Figure 1:
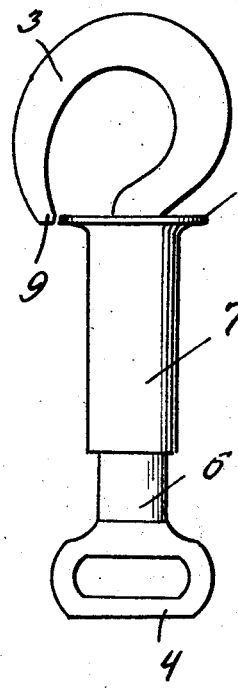
Figure 1 is a side elevation of the snap hook embodying my invention.

In the drawing, wherein for the purpose of illustration is shown the preferred embodiment of my invention, the numeral 1 designates generally my improved snap hook, the same comprising the shank portion 2 at one end of which is formed the hook 3, a strap engaging eye 4 being provided at the opposite end. Formed on the shank portion 2 adjacent the hook 3 are the spiral grooves 5, and the purpose thereof will hereinafter be more fully described. A cylindrical collar 6 is secured on the shank portion adjacent the eye 4, as clearly illustrated in Figure 2 of the drawing.

Surrounding the shank 2, and fitted over the collar 6 is the elongated sleeve 7. An annular flange 8 is formed at the outer end thereof, and the same being adapted for cooperation with the free end 9 of the hook 3, whereby the hook will be closed and the ring which the hook engages will be prevented from becoming accidentally dislodged therefrom as will be hereinafter more fully described. Extending inwardly from the opposed side of the sleeve adjacent the flanged end thereof are the pins 10 and 11 respectively, the pin 10 being arranged adjacent the flange wherein the pin 11 is disposed inwardly of the flange. These pins are adapted to travel in the spiral grooves 5 and provide a means for facilitating the rotation of the sleeve and further prevent the sliding movement of the sleeve without first rotating the same.

A coil spring 12 encircles the intermediate portion of the shank 2, one end of the coil spring being secured to the end of the stationary collar 6 while the other end of the coil spring extends through a suitable opening provided therefor in the intermediate portion of the sleeve 7. This is more clearly illustrated in Figure 2 of the drawing.

Figure 2:
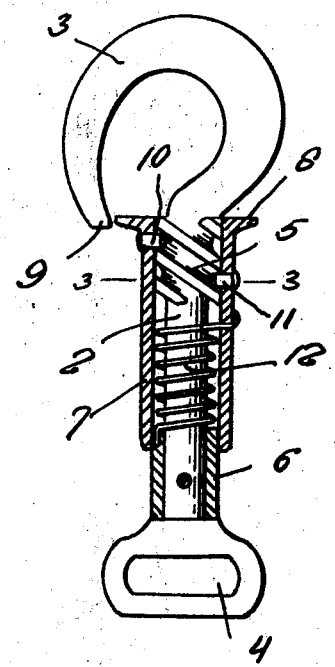
Figure 2 is a longitudinal sectional view of the sleeve and the collar showing the spiral grooves formed in the upper portion of the shank of the hook and the pins carried by the sleeve which are operable in the grooves as well as the coil spring.
Figure 3:
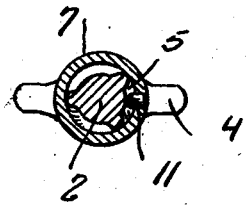
Figure 3 is a transverse section taken approximately on line 3—3 of Figure 2.

The purpose of this coil spring is to provide a means for automatically returning the sleeve to its normal position when the same has been released. The operation of my improved snap hook may be briefly stated as follows: Normally, the parts are arranged as shown in Figures 1 and 2 of the drawing wherein the flange 8 cooperates with the free end of the hook in preventing the accidental displacement of the ring or looped member engaged by the hook, and should an accidental strain be placed on this sleeve, the same will not move rearwardly on the shank.

In order to open the snap hook, it is necessary to rotate the sleeve in one direction causing the pins 10 and 11 to travel rearwardly in the spiral grooves 5, and simultaneously compressing and placing the coil spring 12 under tension. As soon as the pressure on the sleeve 7 is released, the coil spring will automatically cause the sleeve to return to its normal position so that the same will again be brought into cooperative relation with the hook. It is of course understood that the sleeve will rotate and slide freely over the collar 6, this being accomplished by having the inner diameter of the sleeve slightly greater than the outer diameter of the cylindrical collar 6.

It will thus be seen from the foregoing description, that a hook has been provided which will at all times be maintained in a locked position against accidental opening, and simplicity in which the same is constructed enables the hook to be readily and easily opened whenever it is necessary.

While I have shown the preferred embodiment of the invention it is to be understood that minor changes coming within the field of invention may be resorted to if desired without departing from the spirit of the invention and the scope of the appended claims.

Having thus described the invention, what I claim as new and desire to secure by Letters Patent is:—

1. A snap hook comprising a shank having a hook at one end, and an eye at the other end, said shank being provided with a spiral groove adjacent said hook, a sleeve surrounding the shank, a pin extending inwardly from the side of the sleeve and adapted to travel in the spiral groove when the sleeve is rotated to effect the moving of the sleeve away from the hook.

2. A snap hook comprising a shank having a hook at one end, and an eye at the other end, said shank being provided with a spiral groove adjacent said hook, a sleeve surrounding the shank, a pin extending inwardly from the side of the sleeve and adapted to travel in the spiral groove when the sleeve is rotated to effect the moving of the sleeve away from the hook, and means for automatically returning the sleeve to its normal position when the pressure on the same is released.

3. A snap hook comprising a shank at one end, an eye at the other end, said shank being provided with a spiral groove adjacent said hook, a sleeve surrounding said shank, a flange formed on one end of said sleeve and adapted for cooperation with the free end of the hook for closing the latter, means for effecting the movement of the sleeve on said shank whereby the flanged portion is moved out of engagement with the free end of the hook to open the latter.

4. A snap hook comprising a shank at one end, an eye at the other end, said shank being provided with a spiral groove adjacent said hook, a sleeve surrounding said shank, a flange formed on one end of said sleeve and adapted for cooperation with the free end of the hook for closing the latter, means for effecting the movement of the sleeve on said shank whereby the flanged portion is moved out of engagement with the free end of the hook to open the latter, said means comprising a pin extending inwardly from the side of the sleeve and adapted to travel in said groove when the sleeve is rotated.

5. A snap hook comprising a shank having a hook at one end, and an eye at the other end, said shank being provided with a spiral groove adjacent said hook, a sleeve surrounding said shank, a flange formed on one end thereof, said flange adapted to cooperate with the free end of the hook for holding the latter closed, a pin extending inwardly from the side of the sleeve and adapted to travel in said spiral groove when the sleeve is rotated to effect the movement of the flanged portion of the sleeve away from the free end of the hook, and resilient means for automatically returning the sleeve and the flanged portion thereof to its normal position when the pressure on the sleeve is released.

6. A snap hook comprising a shank having a hook at one end, and an eye at the other end, said shank being provided with a spiral groove adjacent said hook, a sleeve surrounding said shank, a flange formed on one end thereof, said flange adapted to cooperate with the free end of the hook for holding the latter closed, a pin extending inwardly from the side of the sleeve and adapted to travel in said spiral groove when the sleeve is rotated to effect the movement of the flanged portion of the sleeve away from the free end of the hook, resilient means for automatically returning the sleeve and the flanged portion thereof to its normal position when the pressure on the sleeve is released, said means including a coil spring encircling the shank, one end thereof being secured to the sleeve, the other end being secured to the shank.

7. A snap hook comprising a shank having a hook at one end, and an eye at the other end, a collar secured on the shank adjacent said eye, said shank being provided with a spiral groove adjacent said hook, a sleeve surrounding the shank and said collar, a flange formed on the outer end of the sleeve and adapted for cooperation with the free end of the hook for holding the latter closed, a pin extending from the side of the sleeve and adapted to travel in the groove when the sleeve is rotated to effect the movement of the flanged portion of the sleeve away from the free end of the hook for opening the latter, and a coil spring encircling the shank, one end thereof being secured to said collar, the other end being secured to the sleeve, said coil spring automatically returning the sleeve and the flanged portion thereof to their normal positions when the pressure on the sleeve is released.

In testimony whereof I affix my signature.

JESSE S. WALLER.